United States Patent [19]
Isoda et al.

[11] Patent Number: 5,445,456
[45] Date of Patent: Aug. 29, 1995

[54] BEARING ASSEMBLY

[75] Inventors: Mitsuharu Isoda, Tokyo; Takashi Mizusawa, Kanagawa, both of Japan

[73] Assignee: Sony Corporation, Tokyo, Japan

[21] Appl. No.: 149,362

[22] Filed: Nov. 9, 1993

[30] Foreign Application Priority Data

Nov. 26, 1992 [JP] Japan ................................. 4-317115

[51] Int. Cl.6 ............................................ F16C 17/00
[52] U.S. Cl. .................... 384/126; 384/902; 384/615
[58] Field of Search ............... 384/126, 454, 453, 114, 384/902, 615

[56] References Cited

U.S. PATENT DOCUMENTS

| | | | |
|---|---|---|---|
| 1,070,709 | 8/1913 | Manley | 384/454 |
| 2,488,825 | 11/1949 | Palumbo | 384/453 |
| 3,784,267 | 1/1974 | Davis | 384/453 |

Primary Examiner—Lenard A. Footland
Attorney, Agent, or Firm—Ronald P. Kananen

[57] ABSTRACT

A bearing assembly comprises a thrust bearing including balls, a fixed wheel having an inner wheel hub and a ball supporting end surface which supports the balls in a first direction of thrust and a rotary wheel having an outer wheel and a ball supporting end surface which supports the balls in a second direction of thrust, and a radial bearing fixed to the inner wheel hub of the fixed wheel of the thrust bearing.

14 Claims, 3 Drawing Sheets

BEARING ASSEMBLY

BACKGROUND OF THE INVENTION

1. Field of the Invention

The present invention relates to a bearing assembly with a thrust bearing for receiving a load in a thrust direction and a radial bearing for receiving a load in a radial direction set up as a single body, and more particularly to a bearing assembly which is most suited to use with a flat motor.

2. Description of the Related Art

Examples of flat motors for the prior art will now be described. First, an description will be given with reference to FIG. 5 of a first example of a conventional motor which is constructed from of a rotor 21 and a stator 31. At this rotor 21, a rotor magnet 22 which is magnetized in the planar direction is attached to the rotor yoke 23, with this rotor yoke 23 then being attached to the rotating axis 25 via a sleeve 24.

The stator 31 is constructed from a coil 32 and a back yoke 33 to which this coil is fixed, at the center of which there is a bearing housing containing two levels of ball bearings 34. The rotor 21 freely rotates about the stator 31 while being supported by the ball bearings 4. Two levels of ball bearings are used in this example of a conventional motor because the stator 31 supports the rotor 21.

As this kind of two level ball bearing construction was expensive, the example of a conventional motor shown in FIG. 6 was proposed as a way of reducing costs. In this motor using a second conventional example the first layer of ball bearings 34 remains but the other level has been changed for an oil containing alloy bearing 36. Also, in a third example in a conventional motor, as is shown in FIG. 7, there is only an oil containing alloy bearing 36 at the first level and a ball positioned at a hole 37 in the center of the rotating axis 25. The oil containing alloy bearing 36 takes the load in the radial direction and the ball 37 takes the load in the thrust direction.

In the above, three examples of the conventional technology are described. However, with regards to the rotor magnet 22, if a rare earth magnet having a strong magnetic attraction was used as the moving magnet, this strong magnetic attraction could not be overcome in the bearing assembly for the prior art. It also proved to be difficult to construct a thin bearing using this kind of two layered construction. Further, if the assembly is made thin, the precision with which the bearing rotates axially is degraded.

As this invention sets out to solve the problems encountered in the prior art, it's object is to provide a bearing assembly where the magnetic attraction of the rotor magnet can be overcome and which can have a thin construction.

SUMMARY OF THE INVENTION

The bearing assembly for the present invention therefore comprises a thrust bearing including balls, a fixed wheel having an inner wheel hub and a ball supporting end surface which supports the balls in a first direction of thrust and a rotary wheel having an outer wheel and a ball supporting end surface which supports the balls in a second direction of thrust, and a radial bearing fixed to the inner wheel hub of the fixed wheel of the thrust bearing.

The bearing assembly for the present invention further comprises a thrust bearing including balls, a fixed wheel having an inner wheel hub and a ball supporting end surface which supports the balls in a first direction of thrust and a rotary wheel having an outer wheel and a ball supporting end surface which supports the balls in a second direction of thrust, the ball supporting surface of the fixed wheel and the inner wheel being made from the same material as the fixed bearing, and a radial bearing drilled in the inner surface of the inner wheel. The radial bearing for the bearing assembly in this invention can also be an oil containing alloy bearing, a hydraulic bearing or a plastic bearing.

In this way, the load in the thrust direction is taken by the thrust axis which is between the balls, and the load in the radial direction is taken by the radial axis made up of, for example, the oil containing alloy bearing. In this way the magnetic attraction in the thrust direction can be strong. Also, the bearing assembly can be made thin as it is a single layer assembly. Further, by forming a thrust bearing which takes the load in the thrust direction and the radial bearing which takes the load in the radial direction as a single body, the motor can be assembled with a higher degree of precision, so that there are no detrimental effects exerted upon the accuracy of the rotation of the motor due to, for example, shifts in the alignment of the vertical position of the bearing. Costs can also be reduced as a bearing housing is no longer necessary.

DETAILED DESCRIPTION OF THE PREFERRED EMBODIMENTS

First Embodiment

The following is a description of an embodiment of the present invention with reference to the diagrams. The present invention is, however, by no means limited to these embodiments. Items which are the same as items described in the prior art will be given the same numerals.

Figure 1:
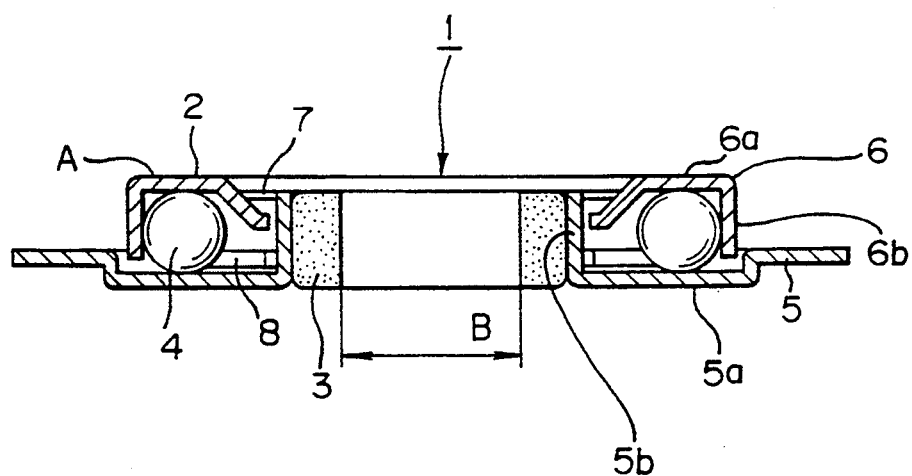
FIG. 1 is a cross-sectional view of a bearing assembly for a first embodiment of the present invention.

FIG. 1 is a cross-sectional view of a bearing assembly for a first embodiment of this invention. In FIG. 1, the bearing assembly 1 in the first embodiment is made up of a thrust bearing 2 and a radial bearing 3. The thrust bearing 2 is then made up of a number of balls 4 and a fixed wheel 5 having an inner wheel rim 5b and a ball supporting end surface 5a for supporting the balls 4 in one direction of thrust, in addition to a rotary wheel 6 having an outer wheel rim 6b and a ball supporting end surface 6a for supporting the balls 4 in another direction of thrust.

This first embodiment is characterized by the fact that the radial bearing 3 is fixed to the inner wheel rim 5b of the fixed wheel 5 belonging to the thrust bearing 2. This means that the construction is such that the thrust bearing 2 receives the load in the thrust direction and the radial bearing 3 receives the thrust in the radial direction. This radial bearing 3 can be a sintered oil containing alloy bearing, a hydraulic bearing such as a spiral globe bearing, or a low friction coefficient plastic bearing. The numeral 7 indicates a shield plate and the numeral 8 indicates a retainer.

Figure 2:
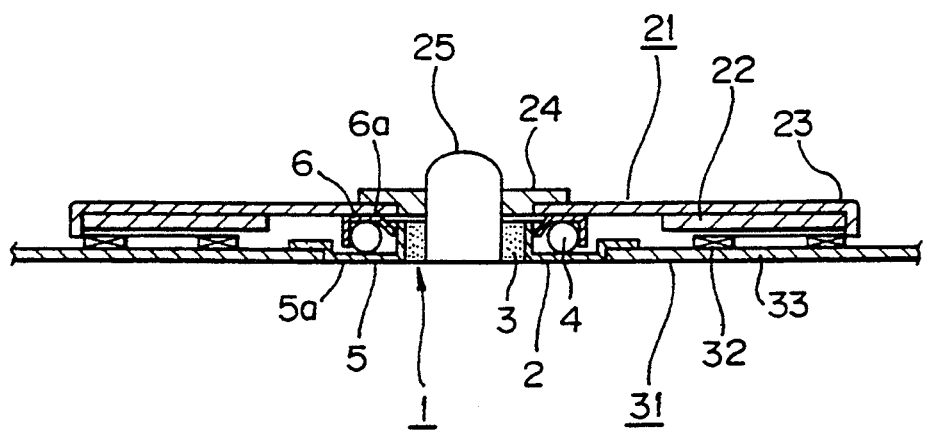
FIG. 2 is a cross-sectional view of a bearing assembly for a first embodiment installed in a flat motor.

This kind of bearing assembly 1 for a first embodiment will be described using the cross-sectional view in FIG. 2 of an example installed in a flat motor. In FIG. 2, the flat motor is made up of a rotor 21 and a stator 31. At this rotor 21, a rotor magnet 22 which is magnetized in the planar direction is attached to the rotor yoke 23, with this rotor yoke 23 then being attached to the rotating axis 25 via a sleeve 24. The second ball supporting surface 6a of the rotary wheel 23 is then positioned near the center of the bearing assembly 1 in this invention.

The stator 31 is made up of a coil 32, with a back yoke 33 then being attached to this coil 32. This back yoke 33 is also fixed to the first ball supporting surface 5a of the fixed wheel 5 of the present embodiment which is positioned at it's center.

The load in the thrust direction from forces such as the magnetic attraction of the rotor magnet 22 on the rotor 21 is received by the back yoke 33 of the stator 31 from the rotor yoke 23 via the first ball supporting surface 5a of the fixed wheel 5, the balls 4 and the second ball supporting surface 6a of the rotary wheel 6a for the thrust bearing 2 in the bearing assembly 1 in this embodiment. The rotating axis 25 for the rotor 21 supports the stator 31 so that it can rotate freely via the radial bearing 3 of the bearing assembly for this invention, and receives the radial load.

The inner wheel rim 5b of the fixed wheel 5 for the thrust bearing 2 which lies between the balls 4 is fixed to the radial bearing 3 made of, for example, an oil containing alloy, by being forced into it, or clenched by it so as to form a single body which makes it a radial/thrust composite bearing. This means that the rotation of the second ball supporting surface 6a of the rotary wheel 6 (surface A in FIG. 1) can be controlled when deciding the internal diameter (B in FIG. 1), and rotation of the rotor 21 can be controlled by making sure that the rotating axis 25 is a tight fit when used with a motor.

Second Embodiment

Figure 3:
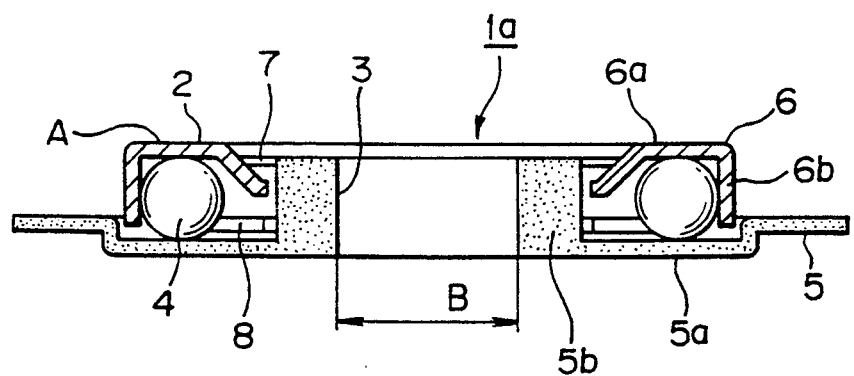
FIG. 3 is a cross-sectional view of a bearing assembly for a second embodiment of the present invention.

FIG. 3 is a cross-sectional view of a bearing assembly for a second embodiment of this invention. In FIG. 3, the bearing assembly 1a in this second embodiment is made up of a thrust bearing 2 and a radial bearing 3. The thrust bearing 2 is then made up of a number of balls 4 and a fixed wheel 5 having an inner wheel rim 5b and a ball supporting end surface 5a for supporting the balls 4 in one direction of thrust, in addition to a rotary wheel 6 having an outer wheel rim 6b and a ball supporting end surface 6a for supporting the balls 4 in another direction of thrust.

The benefits which this second embodiment provide include the fact that the first ball supporting surface 5a and the inner wheel rim 5b of the fixed wheel 5 are formed as a single body from the fixed bearing material and the radial bearing is set up at the inner periphery of the inner wheel rim 5b. This means that the construction is such that the thrust bearing 2 receives the load in the thrust direction and the radial bearing 3 receives the thrust in the radial direction. This radial bearing 3 can be a sintered oil containing alloy bearing, a hydraulic bearing such as a spiral globe bearing, or a low friction coefficient plastic bearing.

Figure 4:
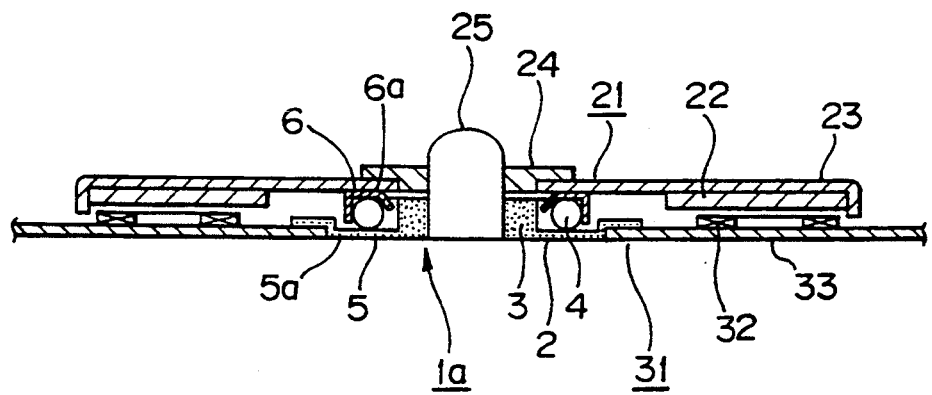
FIG. 4 is a cross-sectional view of a bearing assembly for a second embodiment installed in a flat motor.
Figure 5:
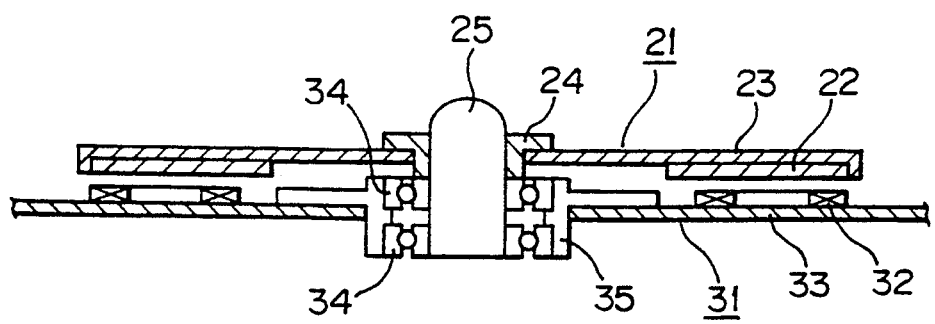
FIG. 5 is a cross-sectional view of a first example of a flat motor for the prior art.
Figure 6:
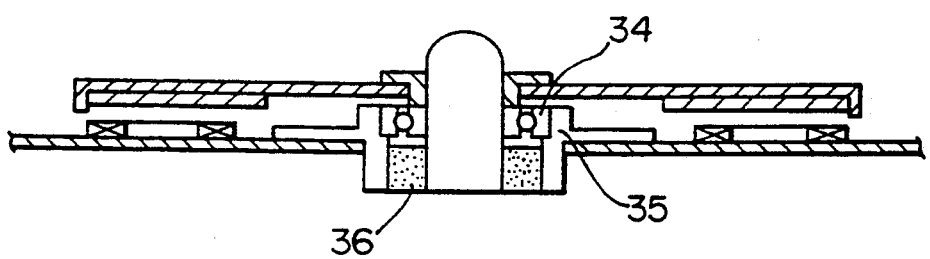
FIG. 6 is a cross-sectional view of a second example of a flat motor for the prior art.
Figure 7:
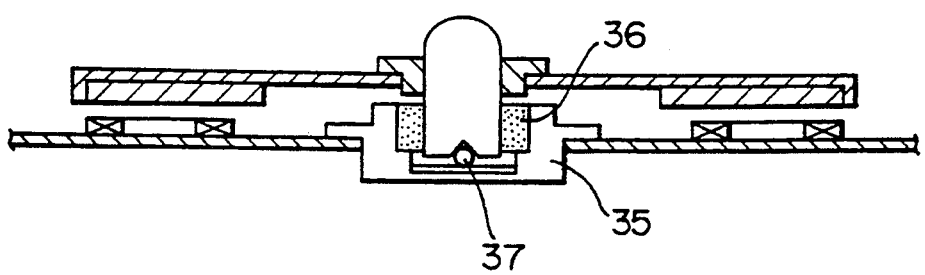
FIG. 7 is a cross-sectional view of a third example of a flat motor for the prior art.

This kind of bearing assembly 1a for a second embodiment is shown in the cross-sectional view in FIG. 4 of an example used in an flat motor. As the construction of this flat motor is the same as that described for the first embodiment in FIG. 4 it's description will be omitted.

As the first ball supporting surface 5a and the inner wheel rim 5b of the fixed wheel 5 are formed as a single body from the fixed bearing material and the radial bearing is set up at the inner periphery of the inner wheel rim 5b in this second embodiment, what were previously two parts have now become one part. Also, the oil containing alloy or plastic bearing can be simply made by sintering or molding, so that cost reductions are possible while high precision is maintained. Further, this means that the rotation of the second ball supporting surface 6a of the rotary wheel 6 (surface A in FIG. 3) can be controlled when deciding the internal diameter (B in FIG. 3), and rotation of the rotor 21 can be controlled by making sure that the rotating axis 25 is a tight fit when used as a motor.

What is claimed is:

1. A bearing assembly comprising:
   balls;
   a thrust bearing in the form of a ball support member supporting said balls in such a manner that said balls may move freely in the radial direction within said ball support member and are restricted from movement in the thrust direction; and
   a plain radial bearing arranged at the inner periphery of said ball support member.

2. A bearing assembly according to claim 1, wherein said ball support member further includes a fixed wheel having a ball supporting end surface which supports said balls in a first direction of thrust and an inner wheel hub, and a rotary wheel having an outer wheel hub and a ball supporting end surface which supports said balls in a second direction of thrust.

3. A bearing assembly according to claim 1, wherein said plain radial bearing is made of an oil containing alloy.

4. A bearing assembly according to claim 1, wherein said plain radial bearing is a hydraulic bearing.

5. A bearing assembly according to claim 1, wherein said plain radial bearing is a bearing made of plastic.

6. A bearing assembly according to claim 1, wherein said plain radial bearing is a hydraulic bearing.

7. A bearing assembly according to claim 1, wherein said plain radial bearing is formed of a sintered material which is impregnated with oil.

8. A bearing assembly according to claim 1, wherein said thrust bearing is disposed radially outward of said plain radial bearing.

9. A bearing assembly comprising:
   a thrust bearing including balls, a fixed wheel having an inner wheel hub and a ball supporting end surface which supports said balls in a first direction of thrust and a rotary wheel having an outer wheel and a ball supporting end surface which supports said balls in a second direction of thrust; and
   a plain radial bearing fixed to said inner wheel hub of said fixed wheel of said thrust bearing.

10. A bearing assembly according to claim 9, wherein said plain radial bearing is formed of a sintered material which is impregnated with oil.

11. A bearing assembly according to claim 9, wherein said thrust bearing is disposed radially outward of said plain radial bearing.

12. A bearing assembly according to claim 9, wherein said plain radial bearing is made of an oil containing alloy.

13. A bearing assembly according to claim 9, wherein said plain radial bearing is a bearing made of plastic.

14. A bearing assembly according to claim 1, wherein said plain bearing has a radially extending flange portion which is unitary with a main body portion of said plain radial bearing, said radially extending flange forming part of said thrust bearing in a manner wherein said balls are rollable on an upper surface of said radially extending flange.

* * * * *